United States Patent
Bendel et al.

(10) Patent No.: US 9,168,705 B2
(45) Date of Patent: Oct. 27, 2015

(54) ROTOR BLADE FOR A WIND TURBINE, METHOD AND MANUFACTURING MOLD FOR THE PRODUCTION THEREOF

(75) Inventors: Urs Bendel, Fockbek (DE); Enno Eyb, Kiel (DE); Martin Knops, Rendsburg (DE)

(73) Assignee: SENVION SE, Hamburg (DE)

( * ) Notice: Subject to any disclaimer, the term of this patent is extended or adjusted under 35 U.S.C. 154(b) by 1345 days.

(21) Appl. No.: 13/000,406

(22) PCT Filed: Jun. 10, 2009

(86) PCT No.: PCT/EP2009/004179
§ 371 (c)(1),
(2), (4) Date: Dec. 21, 2010

(87) PCT Pub. No.: WO2009/156061
PCT Pub. Date: Dec. 30, 2009

(65) Prior Publication Data
US 2011/0142679 A1    Jun. 16, 2011

(30) Foreign Application Priority Data
Jun. 27, 2008   (DE) .......................... 10 2008 030 132

(51) Int. Cl.
*B29C 65/48*   (2006.01)
*B29C 70/86*   (2006.01)
(Continued)

(52) U.S. Cl.
CPC ................ *B29C 70/86* (2013.01); *B29C 65/48* (2013.01); *B29C 66/721* (2013.01); *B29C 66/81455* (2013.01); *B29D 99/0028* (2013.01); *F03D 1/065* (2013.01); *B29C 65/4835* (2013.01); *B29C 70/443* (2013.01); *B29C 70/48* (2013.01); *B29K 2105/06* (2013.01); *B29K 2307/00* (2013.01); *B29K 2309/08* (2013.01);
(Continued)

(58) Field of Classification Search
CPC ................................... F01D 5/34; F01D 5/288
USPC .............. 29/889.21, 463, 889.71; 416/241 R, 416/229 R, 232, 88, 142, 2
See application file for complete search history.

(56) References Cited

U.S. PATENT DOCUMENTS 2,869,649 A * 1/1959 Lux .................................. 416/88
4,648,921 A * 3/1987 Nutter, Jr. ........................ 156/77
(Continued)

FOREIGN PATENT DOCUMENTS

| CN | 1977108 | 6/2007 |
|---|---|---|
| DE | 3113079 | 10/1982 |

(Continued)

*Primary Examiner* — Richard Chang
(74) *Attorney, Agent, or Firm* — Rankin, Hill & Clark LLP (57) ABSTRACT

A rotor blade and a method and a manufacturing mold for the production of a rotor blade for a wind turbine, which extends longitudinally in the operational state from a blade root area to the connection to a rotor hub of the wind turbine and which is divided into at least two segments for its production, wherein at least one subdivision is provided approximately transverse to its longitudinal extension between the blade root area and the blade tip. The method facilitates and shortens the production of the rotor blade, in particular for a series production and to still provide the completed rotor blade as a familiar uniform rotor blade. In the method, the at least two segments, preferably after they have been at least partially produced or partially produced mainly parallel in time, are interconnected in an integration device.

36 Claims, 5 Drawing Sheets

(51) Int. Cl.
    *B29C 65/00*     (2006.01)
    *B29D 99/00*     (2010.01)
    *F03D 1/06*     (2006.01)
    *B29C 70/44*     (2006.01)
    *B29C 70/48*     (2006.01)
    *B29K 105/06*     (2006.01)
    *B29K 307/00*     (2006.01)
    *B29K 309/08*     (2006.01)
    *B29L 31/08*     (2006.01)
    *B29L 31/00*     (2006.01)

(52) U.S. Cl.
    CPC ..... *B29L 2031/082* (2013.01); *B29L 2031/085* (2013.01); *B29L 2031/7504* (2013.01); *F05B 2230/23* (2013.01); *F05B 2280/2001* (2013.01); *F05B 2280/2006* (2013.01); *F05B 2280/4002* (2013.01); *F05B 2280/6013* (2013.01); *F05B 2280/6015* (2013.01); *F05C 2203/02* (2013.01); *F05C 2203/0882* (2013.01); *F05C 2223/00* (2013.01); *F05C 2253/16* (2013.01); *F05C 2253/20* (2013.01); *Y02E 10/721* (2013.01)

(56) References Cited

U.S. PATENT DOCUMENTS

| | | | |
|---|---|---|---|
| 7,654,799 B2 * | 2/2010 | Eyb | 416/229 R |
| 7,895,745 B2 * | 3/2011 | Althoff et al. | 29/889.21 |
| 2006/0083907 A1 | 4/2006 | Bech et al. | |
| 2007/0140858 A1 | 6/2007 | Bakhuis et al. | |
| 2008/0069699 A1 | 3/2008 | Bech | |

FOREIGN PATENT DOCUMENTS

| | | |
|---|---|---|
| EP | 1808598 | 7/2007 |
| EP | 1965074 | 9/2008 |
| WO | 0014405 | 3/2000 |
| WO | 01/46582 | 6/2001 |
| WO | 2006/002621 | 1/2006 |
| WO | 2006082479 | 8/2006 |

* cited by examiner

ROTOR BLADE FOR A WIND TURBINE, METHOD AND MANUFACTURING MOLD FOR THE PRODUCTION THEREOF

BACKGROUND OF THE INVENTION

1. Field of the Invention

The invention relates to a rotor blade and a method and a manufacturing mold for the production of a rotor blade for a wind turbine, which extends longitudinally in the operational state from a blade root area for connection to a rotor hub of the wind turbine up to a blade tip and which is divided into at least two segments for its production, wherein at least one subdivision is provided approximately transverse to its longitudinal extension between the blade root area and the blade tip.

2. Description of Related Art

Divided or respectively segmented rotor blades for a wind turbine have been known in principle for a long time, for example from DE 31 13 079 A1, for facilitation of its production, its transport and its assembly. Since the transport should also, preferably, be facilitated by the state of the art, the segments of the rotor blade are preferably first assembled at the installation location of the wind turbine and are also designed for this.

In contrast, the object of the invention is to facilitate and shorten the production of the rotor blade, in particular for a series production and to still provide the completed rotor blade as a familiar uniform rotor blade.

BRIEF SUMMARY OF THE INVENTION

According to the invention, segments or parts of a rotor blade are advantageously first produced separately or prefabricated preferably at least partially, which has the advantage that production can take place at least partially parallel in time, however, after this, the segments or parts of the rotor blade are integrated with each other into an integrated rotor blade. Beyond the associated time advantages for production, potential manufacturing molds are easier and cheaper to produce, easier to assemble for series production and, like the parts or segments themselves, easier to handle.

An even more efficient production of parts of the rotor blade according to the invention is possible through the method according to the invention in that preferably at least two subdivisions are provided approximately transverse to the longitudinal extension of the rotor blade between the blade root area and the blade tip for formation of at least three segments.

A further development of the method according to the invention provides that the rotor blade is mainly subdivided into a lower half shell and an upper half shell and the segmentation is provided per half shell.

In accordance with a further development of the method according to the invention, it can be provided that subdivisions (also) progressing approximately in the longitudinal extension of the rotor blade are provided for the segmenting of the rotor blade.

In accordance with another development of the invention, it is provided to interconnect in the integration device one or more shear webs or bars, one or more belts, one or more rotor blade root parts, segments, which have otherwise been produced or prefabricated, in particular parallel in time, and/or rotor blade shells formed from segments. For this, the bars, belts, rotor blade root parts and/or segments were preferably produced in advance with a plastics technology.

As a general rule, a plastics technology can preferably be used as the production technology for the method according to the invention, in which at least one resin and at least one fiber layer, in particular made of glass fibers and/or carbon fibers, is used. The technology can be, in particular, resin transfer molding (RTM) technology, resin infusion molding (RIM) technology, in particular vacuum-assisted resin infusion (VAR) technology, or a similar or comparable technology. However, for example, a laminating technique can also be used in full or in part.

Segments and/or (other) components can be adhered together in the integration device. However, it is preferably provided that in the integration device segments and/or (other) components are interconnected with one of the aforementioned plastics technologies so that, as already explained above, individual parts are produced for production-increasing reasons, but can be integrated into an integrated rotor blade, which is not inferior to a rotor blade produced integrally in a single manufacturing mold, which consists if applicable of two half shells, in particular the segmentations of the rotor blade from the preproduction according to the invention are not noticeable or disruptive after its integration nor do have a disruptive impact on the finished rotor blade in any manner.

It can also be provided, in particular, that in the integration device segments and/or components are interconnected through frictional and/or form fit connections or a frictional and/or form fit connection, in particular through butt-strapping, joining, scarfing, groove and springs or the like, preferably in order to additionally secure connections or to design them without seams.

Another development of the method according to the invention for production of a rotor blade for a wind turbine, for which independent protection is also claimed, is characterized in that at least one of the components to be connected with at least one other component is trimmed. In particular, balsa wood or a balsa wood sandwich can be used for trimming. At least one belt is preferably trimmed. Transitions are hereby attenuated and connections are secured and power transmissions and power trains, also in different directions, are improved or guaranteed, preferably with a material that is particularly suitable for it and has little additional weight.

Another development of the method according to the invention provides that during insertion into the integration device between two components to be interconnected, in particular between two segments, a gap for the insertion of at least one connection material is left for its connection, in order to also hereby design the connection more securely and more seamlessly. It can thereby be provided that the gap for the inflow of a free-flowing connection material and for a solid material, preferably a fiber material, in particular an inlay made of it, is used.

At least one electrical heating device, preferably a microwave device or a heating blanket, can advantageously be used for heating, drying and/or hardening components and/or component connections. For example, air or another medium can also be used, which would have the advantage of also being able to be used for cooling, if necessary.

It is preferably provided according to the invention that the components are first hardened or pre-hardened, the components are then added or put to the integration device, interconnected there and the connection and/or the composite of components is then dried and/or hardened.

A particular advantage of the method according to the invention consists in that manufacturing molds that can be used parallel in time are used for the production of components. It could be provided in particular that a production of components parallel in time is performed, in which the components to be produced, in particular according to their type, quality and/or size, are or will be designed such that the components can be made available to the integration device together within 24 hours. Overall, it could thus be achieved that the production of the components and their integration in the integration device is planned and performed such that a or the rotor blade can mainly or almost be provided within 48 hours.

Another development of the invention, for which independent protection is also claimed, is characterized in that an integration device is used as the manufacturing mold for a half shell of a rotor blade wing, wherein production preferably takes place using an aforementioned plastics technology and wherein at least a first segment is inserted prefabricated or semi-prefabricated into the integration device and at least a second segment is first produced in the integration device on the first segment or under integration of the first segment. Production and integration are thus particularly advantageously performed simultaneously in the integration device. The expense of using the device as a manufacturing mold is reduced in that it is used as an integration device and partial production can be performed in advance or in parallel in another, smaller manufacturing mold. However, an integrated rotor blade or respectively half shell is formed in the integration device as a manufacturing mold, which appears integrally produced through the assembly taking place in the integration device with all conventional advantages and additional advantages according to the invention of technical and economic nature.

According to the invention, assembly and usage can preferably take place such that in the integration device during the production of the half shell of the rotor blade, a finished or semi-finished first segment and a second segment to be produced alternate spatially during usage of the integration device. During integration, the finished or semi-finished segment can be particularly well integrated into the production of the segment to be produced and the usage takes place in the virtually accustomed manner, but considerably faster and easier.

In particular, according to the invention, at least one belt and at least one bar can also be prefabricated and integrated or connected in the integration device with a half shell of a rotor blade. Furthermore, at least one belt or one bar can thereby bridge a separation between two segments of the half shell and thus ensure a further, secure connection and power transmission.

Another development of the invention or respectively independent invention, for which independent protection is also claimed; is characterized in that at least one belt/bar assembly or component is prefabricated and given to the integration device for connection with a shell of a rotor blade. This measure according to the invention also makes the use and occupancy of the integration device more economical. For this, it can be provided that the half shell is at least partially produced in the integration device, the integration device is thus, also used as a manufacturing mold and the belt/bar assembly or component is thereby integrated into the half shell so that the manufacturing mold is also used more economically through this method according to the invention.

At least one layer, in particular fiber layer, can be used during the production of the half shell or for its completion for connection of the half shell with the belt/bar assembly or component.

Another development of the method according to the invention provides that, for the production of the half shell using vacuum infusion technology or other vacuum-assisted plastics technology, a vacuum seal with at least one film occurs and that the belt/bar assembly or component is incorporated in the seal for production of the half shell for its connection with the half shell.

The connection of the belt/bar assembly or group can thereby also take place with the shell in the production technology and thus provide an integrated rotor blade. It is preferably provided that a mainly L-shaped belt/bar assembly or component is produced, in a manner such that a belt and a bar are mainly aligned with each other in an L shape. The L shape can thereby be connected with a shell of a rotor blade, preferably such that the bar rises out of the shell and that this L shape with a corresponding L shape of another shell mainly forms a box shape during the connection of the two shells with each other. A manufacturing mold for the belt/bar assembly or group can already be designed such that a manufacturing mold is used for the production of the L shape, in which the belt participating in the L shape and the participating bar are arranged and/or produced at a correct angle to each other. At least the belt or the bar could thereby be incorporated prefabricated into the manufacturing mold and the other part, preferably with layers for plastics technology, could be produced (on it).

A further development of the method according to the invention or respectively independent invention, for which also independent protection is claimed, is characterized in that at least one component, preferably at least the belt or the bar, is produced from prefabricated parts, so-called prepregs. The use of so-called prepregs can advantageously shorten the production time; on the other hand, precisely in the conceptual design of the method according to the invention, no loss of quality should be feared.

Another development of the method according to the invention provides that at least one layer is incorporated into the manufacturing mold for the production of at least the belt or the bar such that it bridges, preferably encircles, a butt joint between the two parts such that a connection is established between the parts also through this layer during the production of the belt and/or the bar. In this manner, an already finished part is incorporated in a form fit or positively connected manner into the production of a part still to be produced in a certain manner, which benefits the cohesion and in particular also the power transmission.

For example, the bar could also be designed mainly approximately C-shaped for the formation of connection flanges for a belt.

The already mentioned manufacturing mold for a belt/bar assembly or group could provide that the manufacturing mold has a mainly approximately V-shaped depression for the L-shaped incorporation of material. In particular for better and more comfortable usage, it can also be provided that the manufacturing mold is pivotable around a mainly horizontal axis.

Independent protection is also claimed for a rotor blade for a wind turbine according to the invention, which extends longitudinally in the operational state from a blade root area for connection to a rotor hub of the wind turbine up to a blade tip and which is divided into at least two segments for its production, wherein at least one subdivision is provided approximately transverse to its longitudinal extension between the blade root area and the blade tip and which in independent solution of the object is characterized in that the at least two segments are interconnected in an integration device.

The advantages achieved with this solution, according to the invention, have already been sufficiently explained in connection with the method according to the invention.

It is preferably provided, according to the invention, that at least two subdivisions are provided approximately transverse to the longitudinal extension of the rotor blade between the blade root area and the blade tip for formation of at least three segments. The rotor blade is preferably mainly subdivided into a lower half shell and an upper half shell and the segmenting is provided per half shell.

It can also be provided according to the invention that a subdivision progressing approximately in the longitudinal extension of the rotor blade is provided for the segmenting of the rotor blade.

Integration according to the invention of at least partially in parallel produced parts of the rotor blade according to the invention into a unit with the usual quality preferably takes place in that one or more bars, one or more belts, rotor blade root parts, segments and/or rotor blade shells formed from segments are interconnected in the integration device.

The bars, belts, rotor blade root parts and/or segments are preferably produced using a plastics technology, wherein at least one component is produced preferably with the plastics technology using at least one resin and at least one fiber layer, in particular made of glass fibers and/or carbon fibers.

The segments and/or (other) components can, for example, be adhered together and/or more preferably interconnected through one of the aforementioned plastics technologies.

Alternatively or additionally, the segments and/or components are interconnected through frictional and/or positive connections or a frictional and/or form fit connection, in particular through butt-strapping, joining, scarfing, groove and springs or the like.

Another development of the invention or respectively independent invention, for which independent protection is also claimed and which has also already been explained in connection with the method according to the invention, provides that at least one component to be connected with at least one other component is trimmed. This trimming preferably comprises balsa wood or a balsa wood sandwich. A belt is preferably trimmed.

A next development of the rotor blade according to the invention is characterized in that, for a production of components parallel in time, the components to be produced, in particular according to their type, quality and/or size, are designed such that the components can be made available to the integration device together within 24 hours. It is preferably provided according to the invention that the segments are designed such that they have or cover approximately equally sized surfaces.

In the case of the rotor blade according to the invention, at least one belt and at least one bar are preferably prefabricated and integrated or preconnected with a half shell of a rotor blade. Also, at least one belt or one bar could bridge a separation between two segments of the half shell. At least one belt/bar assembly or component is even preferably prefabricated and preconnected with a half shell of the rotor blade. In one exemplary embodiment, at least one layer, in particular fiber layer, can be used in the production of the half shell for connection of the half shell with the belt/bar assembly or component.

In accordance with a further development, the rotor blade according to the invention comprises a mainly L-shaped belt/bar assembly component. The L shape can thereby be connected with a shell of a rotor blade such that the bar rises out of the shell and this L shape with a corresponding L shape of another shell mainly forms a box shape during the connection of the two shells with each other. This results in a fast, precise and stable production and an accordingly advantageous rotor blade.

Another development of the invention provides that at least one component, preferably at least the belt or the bar, is produced from prefabricated parts, so-called prepregs, wherein this can take place easier in the case of the belt than in the case of the thin bar maybe made only of one fiber layer.

It can be provided that that at least one layer for the production of at least one belt or bar bridges, preferably encircles, a butt joint between two parts such that a connection is established between the parts also through this layer. For example, the bar could be designed for the formation of connection flanges for a belt also mainly approximately C-shaped.

Independent protection is also claimed for a manufacturing mold for the production of a rotor blade for a wind turbine, which is characterized according to the invention in that an integration device provided for the connection of at least two segments or components is designed as a manufacturing mold for a half shell of a rotor blade, in which the production preferably takes place by means of an aforementioned plastics technology and can be incorporated prefabricated or semi-prefabricated into the at least one first segment and at least one second segment is to be produced first in the integration device on the first segment or under integration of the first segment. According to the invention, a manufacturing mold that advantageously is or comprises an integration device and thereby has a particularly advantageous, quasi hybrid nature for the production of the rotor blades thus results. Such a manufacturing mold according to the invention can be designed and provided for the integration of an entire rotor blade, such a manufacturing mold according to the invention can also be specially designed and provided for the integrative design of a belt/bar assembly or group and is characterized in that it is provided for production of an L shape formed from a belt and a bar, in which the belt participating in the L shape and the participating bar are to be arranged and/or produced at a correct angle to each other.

According to a further development, this special manufacturing mold can have a mainly approximately V-shaped depression or the L-shaped incorporation of material.

Each conceivable manufacturing mold according to the invention, but in particular the manufacturing mold for the design of the belt/bar assembly or group, can preferably be pivotable around a mainly horizontal axis for better and more comfortable use.

Within the framework of the invention, the formulation "approximately transverse to the longitudinal extension or respectively to its longitudinal extension" is understood as in particular transverse or diagonal to the longitudinal extension, preferably mainly horizontal or horizontal to the longitudinal extension.

In this respect, within the framework of this application, a term in parentheses indicated that the content in parentheses is a particularly preferred variant.

The term "semi-prefabricated" means in particular partially prefabricated within the framework of the invention. It can also in particular be understood in that mainly half of the production time or respectively the production effort was used in particular with respect to the built quantity.

Within the framework of the invention, a "correct angle" is in particular a predeterminable or respectively specifiable or specified angle.

Exemplary embodiments, from which further inventive characteristics can result, but to which the scope of the invention is not limited, are shown in the drawing. The drawing shows schematically in:

DETAILED DESCRIPTION OF THE INVENTION

It is first noted that the figures in the drawing only show principle exemplary embodiments of the invention, for which various variations are possible within the framework of the invention. Moreover, none of the figures are drawn true to scale or even accurate to size. The shown exemplary embodiments should only be sketched schematically as principle possibilities.

Figure 1:
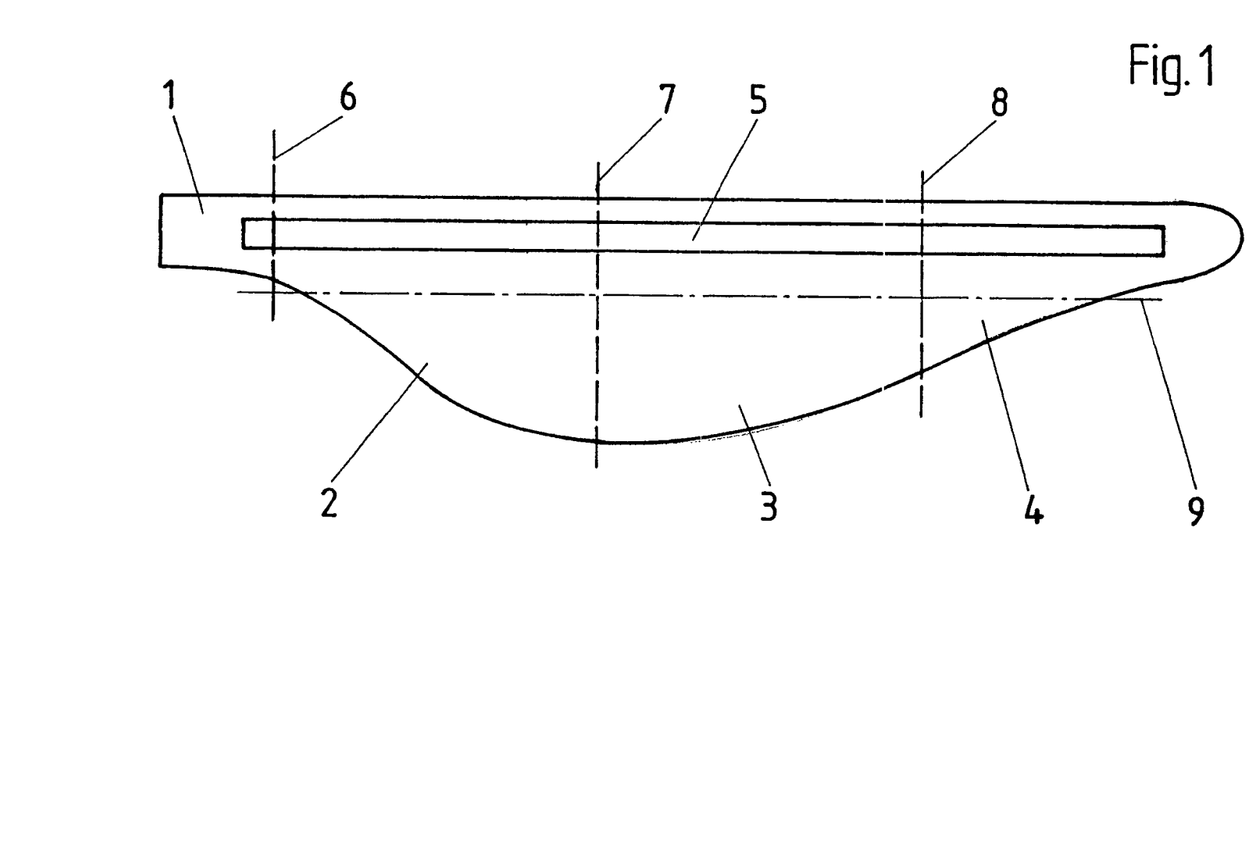
FIG. 1 a top view into a half shell of a rotor blade.

FIG. 1 shows a top view into a half shell of a rotor blade. According to the invention, the shown half shell is subdivided into several segments 1 through 4. Of these segments 1 through 4, all or a few can be produced or prefabricated mainly parallel in time and then integrated into a half shell of the rotor blade in the manner shown in FIG. 1, which can occur in a corresponding integration device. But this integration device can also be used as a manufacturing mold in that a few of the segments are first produced in this manufacturing mold and/or the half shell is finished with partially prefabricated and partially still-to-be-produced segments.

It is preferably provided according to the invention that a segment is formed by a so-called rotor blade root 1 and the remaining half shell is subdivided into three segments 2 through 4. The segments 2 through 4 are designed by transverse divisions 6 through 8 such that they are approximately the same size and can be produced approximately at the same speed. These segments 2 through 4 could be subdivided, for example, by a longitudinal division 9 but also into even more segments.

An undivided belt 5 connecting these segments that also and in particular serves to transmit power during the loading of a rotor blade arranged on a wind turbine preferably progresses over segments 1 through 4. Instead of a belt 5, two or more mainly parallel and distanced belts can also be provided if applicable, i.e. a so-called leading edge belt and a trailing edge belt, referring to the edges of the rotor blade, to which they are the closest.

A complete rotor blade is thereby designed as a hollow body such that a second, mirror-inverted half shell is placed on a half shell approximately as shown in FIG. 1 and the two half shells are interconnected. Hot air, for example, can be introduced to this hollow body in order to temper and completely harden the rotor blade even further. The half shells are preferably designed by means of a plastics technology, in that for example glass-fiber and/or carbon-fiber layers are inserted or inlaid in a manufacturing mold, which provides the three-dimensional shaping of the half shell and is then entirely covered with a vacuum film. This vacuum film is vacuum-sealed all the way around the edges on the manufacturing mold, for example with rubber-like adhesive strips or double-sided adhesive tape. This vacuum film, thus, forms the flexible counter mold for the solid manufacturing mold. In so-called vacuum infusion technology, a negative pressure, a "vacuum", is then created through air removal between the vacuum film and the manufacturing mold. This negative pressure presses the fiber layers together and a resin is sucked under the vacuum film from a reservoir and is evenly distributed over the entire mold and the fiber layers are permanently interconnected to form a solid plastic mold part, the half shell, after hardening. An even distribution of the resin can be achieved in that several supply lines for the resin are laid and suitable net or lattice layers are incorporated into the mold, which benefit and direct the distribution and the planar flowing of the resin.

A preferred exemplary embodiment of the method according to the invention provides in consideration of FIG. 1 to prefabricate the segments 1 and 3 in separate, more-manageable manufacturing molds and to then insert them into the production and integration device for the entire half shell at the correct position shown in FIG. 1. The entire half shell can be, for example, over 60 meters long, while the segments are correspondingly shorter and thus also the manufacturing molds required for them. The operational demands of the manufacturing mold for the entire half shell can thereby be utilized as little and for as short a time as possible according to the invention.

The segments 2 and 4 are preferably first produced in the manufacturing mold for the entire half shell. As explained, corresponding fiber layers are incorporated into the manufacturing mold for this. The prefabricated segments 1 and 3 are inserted into the manufacturing mold such that the corresponding holes or vacancies for the not-yet-ready segments 2 and 4 remain in the manufacturing mold, but for which the fiber layers are provided in the manufacturing mold. The segments 1 and 3 and the fiber layers are inserted into the manufacturing mold such that the segments 1 and 3 are integrated into the fiber layers of the segments 2 and 4 and are connected with them during and after production of the segments 2 and 4 and namely into a one-piece half shell, which in principle looks like normal and is in particular stressable or resilient. For this, the vacuum film for the production of the segments 2 and 4 is, for example, laid and sealed under inclusion of all segments over the entire length of the manufacturing mold and the manufacturing mold is flooded with resin.

The belt 5 can later be applied to the, in principle, finished half shell and e.g. adhered to it, but it can also be integrated into the half shell according to the invention. At least one bar is placed onto the belt edgewise, which follows the progression of the belt and interconnects the two half shells or respectively their belts in the finished rotor blade. According to the invention, a belt/bar group is preferably prefabricated and then integrated into the half shell in the production and integration device.

According to the invention, particular attention can be paid to the seam area between two segments.

Figure 2:
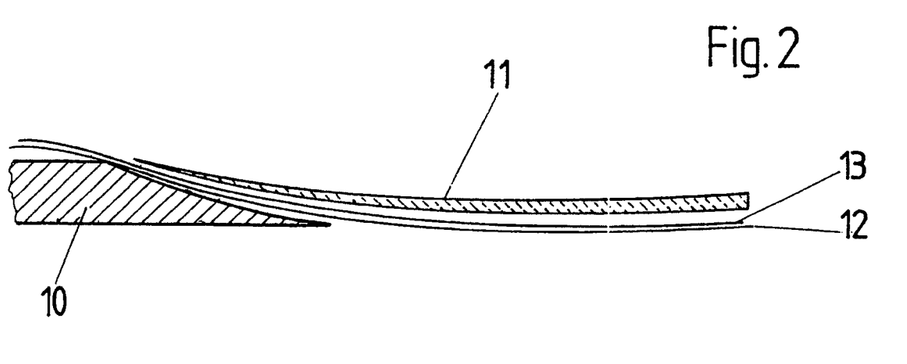
FIG. 2 a cut through a seam area between two segments of a half shell of a rotor blade in a first exemplary embodiment, FIG. 3 a cut through a seam area between two segments of a half shell of a rotor blade in a second exemplary embodiment, FIG. 4 a cross-section of a manufacturing mold for a belt/bar assembly or group, FIG. 5 the cross-section of the manufacturing mold in accordance with FIG. 4 with inserted components, FIG. 6 a section from the cross-section in accordance with FIG. 5 with other examples of components, FIG. 7 two belt/bar assemblies or groups according to the invention before their connection, FIG. 8 a cross-section through a part of a half shell of a rotor blade to be produced during integration of a belt/bar assembly or group and FIG. 9 a cross-section of manufacturing mold for a half shell of a rotor blade with usage in accordance with FIG. 8.

FIG. 2 shows in cross-section, a first exemplary embodiment option for such a seam area. These options do not just apply to segments, but also to components to be connected in general. One of these parts is labelled with 10 in FIG. 2. It could be, for example, a finished segment 3. The part connecting to it should still be produced on it, for example a segment 4. For its production, mainly the aforementioned fiber layers 12, 13 are provided. The layer structure can naturally be considerably more complicated than indicated here and in particular more or fewer fiber layers can be used. These fiber layers do not have to be continuous, but can rather be, for example, overlapping or non-overlapping sections. They preferably contain oriented fibers, which for example run to a large percentage in the longitudinal direction of the half shell in order to ensure in particular great loading capacity, flexibility and tensile strength of the rotor blade.

During production of the component still to be produced, for example the segment 4, so-called prepregs 11 or even foam cores or the like can be used additionally or in certain circumstances also alternatively, in order for example to accelerate the occupancy of the manufacturing mold and thus production and the in-house work can be restricted by supplies.

Figure 3:
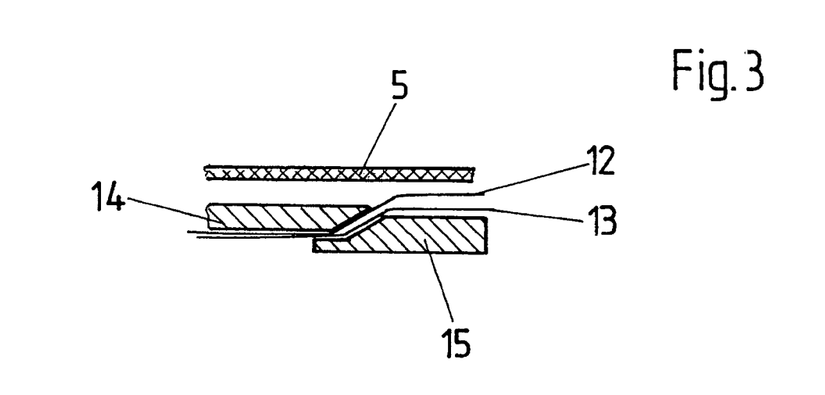

In contrast, FIG. 3 shows in cross-section an option for the connection of two components 14, 15 or segments that are both already prefabricated. Positive or form fit connections can be provided for this and additional connecting fiber layers 12, 13 can be used. Moreover, the continuous belt 5 could be provided in particular for further connection or also another suitable part.

Figure 4:
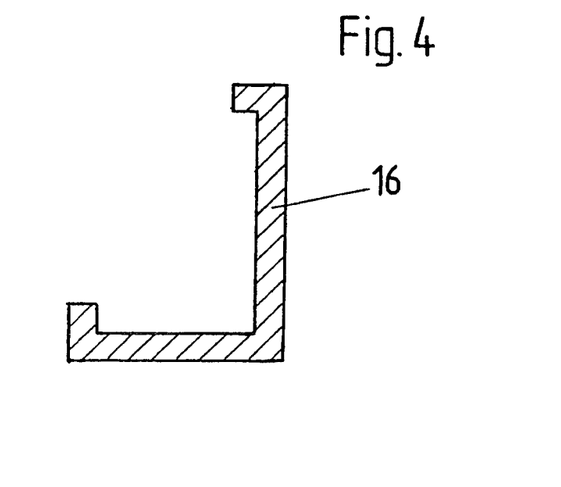

FIG. 4 shows in cross-section an exemplary embodiment of a manufacturing mold 16 according to the invention for a belt/bar group according to the invention, in which a belt and a bar should first together form an L shape. The solid manufacturing mold is also already specified accordingly.

Figure 5:
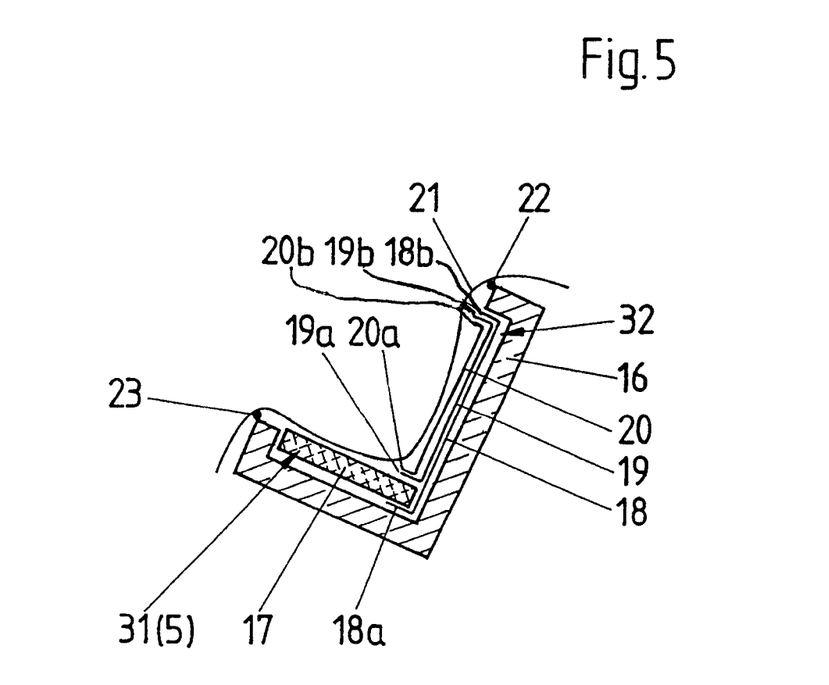

FIG. 5 shows an option for producing the named belt/bar group in the manufacturing mold 16. For more comfortable use of the manufacturing mold 16, it is designed pivotable or tiltable around a horizontal axis.

As also already shown for the half shell in connection with FIG. 1, one of the components can also already be prefabricated, while the other part is first produced in the manufacturing mold 16 and is integrated with the already finished part.

In the example of FIG. 5 shown above, the belt 31 or 5 is already finished in principle and is available as a part 17. The bar 32 is first produced from layers 18, 19, 20 (number again variable). These layers are inserted such that they partially encircle the finished part 17 and are thereby incorporated in the production of the bar 32 still to be produced. For this, the inserted layers show, in particular, flange bendings 18a, 19a, 20a. Such bendings 18b, 19b, 20b preferably protrude also on the other side of the bar to be produced in order to be able to better connect the bar 32 with the belt 31 of the other half shell later. The bar 32 thereby receives in principle a type of C shape. The entire manufacturing mold is finally covered with a vacuum film 21, which is vacuum-sealed with adhesive strips 22, 23 with respect to the manufacturing mold 16.

Figure 6:
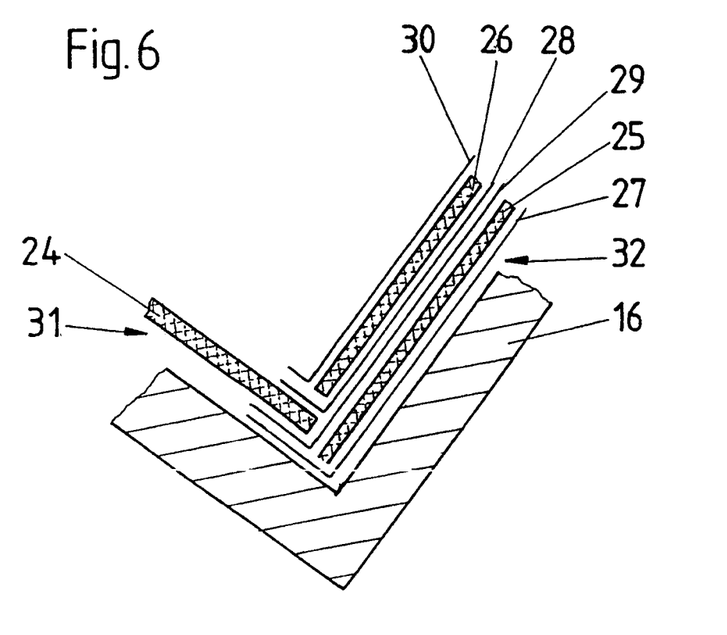

FIG. 6 shows again in cross-section a section from a manufacturing mold 16 with a somewhat different usage. The belt 31 can here again already be finished in principle and be available as a finished part or prepreg 24. But this time, the belt 32 is produced from layers 27, 28, 29, and from prepregs 25, 26.

Figure 7:
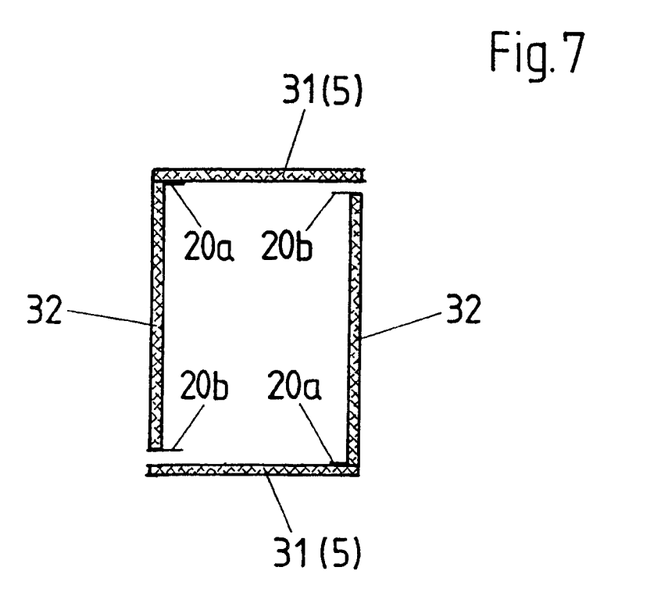

FIG. 7 shows in cross-section the potential connection of two belt/bar groups to a type of box shape for two half shells of a rotor blade with the reference numbers from FIG. 5.

Figure 8:
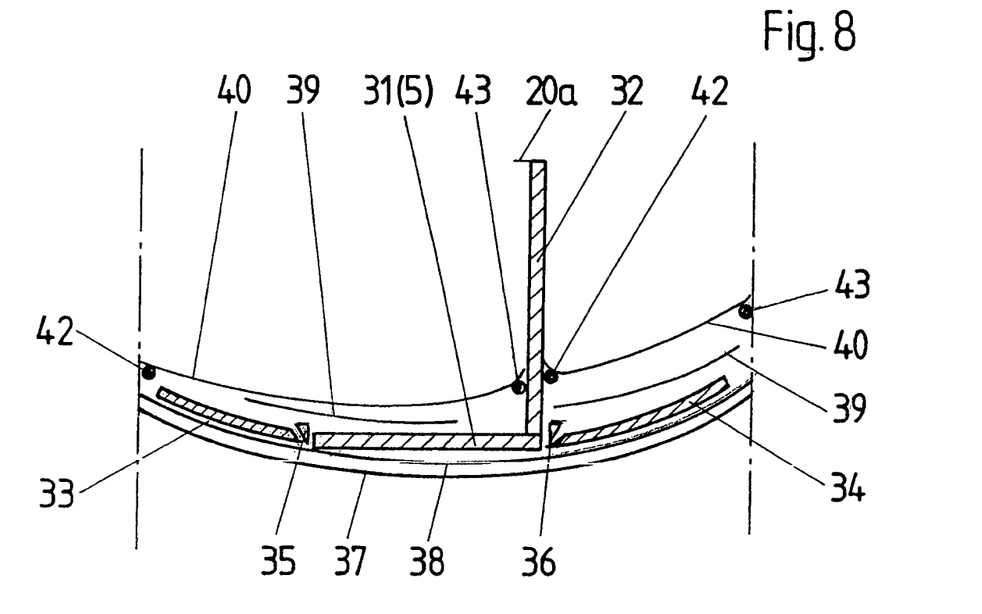

FIG. 8 shows in cross-section a section of a half shell of a rotor blade during its production according to the invention. The section is defined left and right in the figure with dashed lines. The solid manufacturing mold for the half shell is not shown in FIG. 8.

As already noted above, fiber layers 37, 38 can be used for the production of the half shell. A finished belt/bar group 31, 32 can be fitted onto these fiber layers 37, 38 according to the invention for its integration into the half shell. Additionally, prepregs 33, 34 could be used. Seam-overlapping connection layers 39 can also be provided. Finally, gaps or intermediate spaces can be filled with, for example, parts 35, 36 made of foam (cores) or balsa wood. In particular with balsa wood, the belt 31 (5) can also be trimmed according to the invention before it is positioned or fitted.

Finally, everything is covered with vacuum films 40, which are vacuum-sealed on their edges with adhesive strips 42, 43 for example also with a type of double-sided adhesive tape, and here according to the invention such that only the bar 32, against which is also sealed, partially protrudes. The vacuum seals 42, 43 on the bars could already be arranged on the belt/bar group, potentially also already with the vacuum films 40, before this component is placed into the integration device and onto the half shell in order to avoid that the half shell material needs to walked on if possible in order to fasten the vacuum film 40 on the rising bar. It is also possible to eliminate the vacuum seals 42, 43 on the bar 32 altogether and to guide the vacuum film 40 undivided over the entire bar 32.

Figure 9:
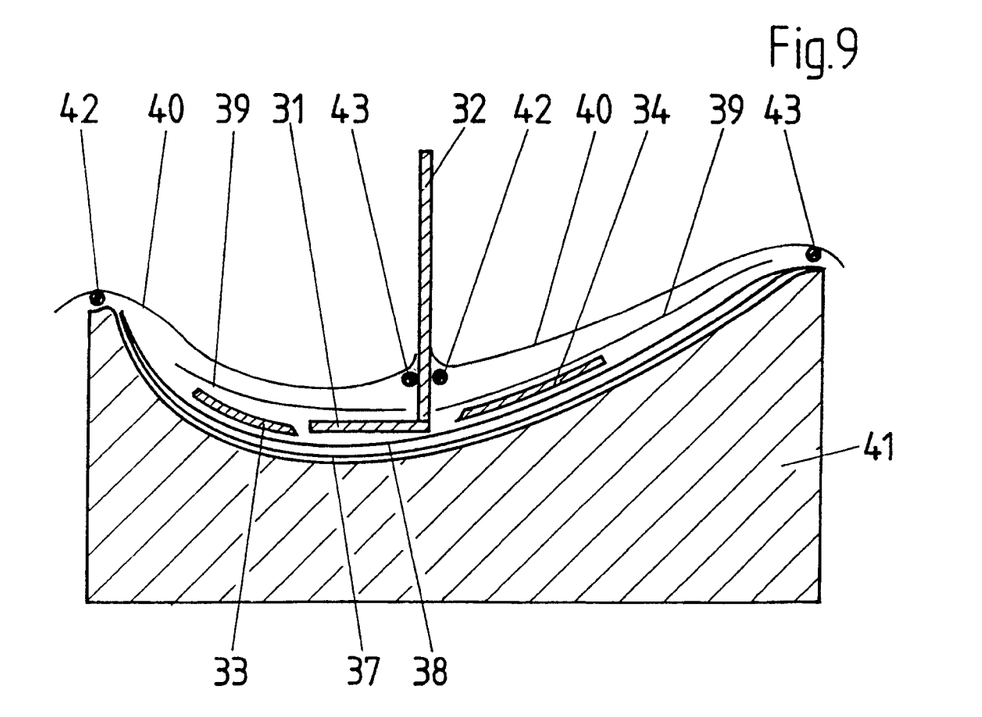

FIG. 9 shows again mainly a similar representation as in FIG. 8 with the same reference numbers, but this time with the solid manufacturing mold 41 as foundation and over the entire width of this manufacturing mold 41. Here again, it is noted that the representations are not true to scale, which is particularly clear when comparing FIGS. 8 and 9.

Finally, a few characteristics and advantages of the invention should be emphasized again. However, this emphasis or repetition should not mean or cause a limitation in the scope of the invention.

First, the invention is based on the idea of producing individual segments of a rotor blade each of which do not have the entire blade length. This can help to optimize the use of participating manufacturing molds and shorten production time to make production more productive overall. In particular, series production can be achieved in which the segments can be produced for a rotor blade within 24 hours and the rotor blade can be assembled in another 24 hours from the segments and other components of the rotor blade. The rotor blade itself can thus be produced overall ready for series production and with constant quality within at total of 48 hours, and namely even rotor blades that are longer than 60 meters. Such blades represent namely a technical production challenge not only because they are so long but accordingly also have a greater projected surface of for example approximately 190 square meters and also a greater mass, of for example approximately 21 tons.

For example, segments (blade shells) are constructed divided such that they can be produced within the named 1st production step. In the 2nd production step, all individual parts could be trimmed and prepared for their integration, which then takes place in a separate integration device, for example with quick setting adhesive. In the case of a rotor blade of approx. 60 to 65 meters, preferably 2 to 3 segments or blade shells could be provided for a complete half shell.

For the production of the segments and remaining components, different plastics technologies come into question, in particular also the vacuum infusion method.

In joint areas, in particular between segments, a sandwich foam to be used in addition to fiber layers can be omitted or leaved open and an inner layer and an outer layer of the segments could be joined via a scarf or tapered overlap, for example in a supporting substance. The actual connection can then take place through adhesion, for which a recess could be provided in at least one of the segments. Another alternative would exist, for example, in that the segments are combined end to end and the joint is then laminated over. But it can, for example, also be provided to let an inner layer, an outer layer and a potential supporting substance end in stages and to adhere a prefabricated part to this disconnection point in order to, thus, produce the connection between segments. Another option could be to provide an L-shaped flange at disconnection points in which an inner laminate and an outer laminate flow and to which a supporting substance directly connects. The segments are then adhered directly with the help of this flange. A fabric layer should eventually be provided from the outside in order to reduce the peel stress of the connection.

However, production could also take place overall with classical hand lamination or, for example, with resin transfer molding or other plastics technologies. When using resin transfer molding, a gap of approximately 1 to 3 millimeters, in which a medium, e.g. a woven material, a fleece or a fabric could be laid, which ensures good resin flow, should remain between hardened parts as joint partner for their connection. Unevennesses in the surfaces of the joint partners could thereby be counterbalanced and one would obtain an adhesion without voids.

Adhesions could be quickly hardened by means of local heating, for example with heating blankets or microwaves before the half shells are adhered together. Each half shell, according to the invention, could for example consist of at least one main, leading edge and/or trailing edge belt, at least two segments of the shell and a root piece with a potential blade connection. These individual parts can be designed through divisions running diagonal to the longitudinal extension of the rotor blade, the positions of which, for example, could be specified as relative to the overall length L, which could begin at 0.0 L after the root feeder for the entire actual shell. The first segment could then reach e.g. from 0.0 L to approximately 0.23 L, the second segment from approximately 0.23 L to approximately 0.5 L and the third segment from approximately 0.5 L to approximately 1.0 L. The first segment and the third segment could then thereby each have approximately 30% of the projected surface of the rotor blade and the second segment approximately 40%.

Separate and individual manufacturing molds could exist for all of these individual parts, which could be designed similar to the principle of half shell molds. There is an additional integration device for these individual manufacturing molds, in which the individual parts could be positioned with respect to each other and integrated and connected with each other, but which can also be used additionally or alternatively as a manufacturing mold for the half shell, in particular for post-production of areas of the half shell, for which there are still no individual parts. This production can particularly advantageously be combined with the integration and connection of individual parts. In particular, the root or flange insertion and a middle segment of the half shell could be prefabricated and a first and a third segment in the integration device, which then thereby forms a main mold, could be post-produced during integration.

The individual parts produced according to the invention can also be subjected to a quality test individually before their integration so that potential rejects also remain more limited according to the invention.

The joined rotor blade could also be completely hardened in a separate temper chamber.

According to the invention, it can also be provided in particular to prefabricate belt/bar groups. Such a group can be integrated into the respective half shell in the suction-side half shell and in the pressure-side half shell and, during connection of the two half shells with each other, the two groups are then also preferably interconnected into a box shape. According to the invention, an integrated half shell can be developed without thick-layer adhesion.

The belt/bar group, according to the invention, is preferably produced such that each integral component is developed with a belt and a bar. For this, a mainly L-shaped mold is preferably needed, one side of which is removed from the blade shell surface and receives the belt layers and the other side of which presents the mainly even bar geometry. The manufacturing mold is preferably swivel mounted so that either the belt side is horizontal or the bar site is horizontal or an intermediate position is assumed, which is particularly advantageous for the insertion and/or infusioning. Moreover, the manufacturing mold could be designed separable in order to facilitate removal from the mold.

The belt layers are preferably first inserted into the manufacturing mold and immobilized, for example, with lattice tape. The layers for the bar are then inserted and overlapped with the belt layers such that a mainly C-shaped bar mold results.

The belt can also be produced from prepreg material. The bar is produced on it with plastics technology. Since the prepreg material is somewhat sticky, no further fixing agent is required for positioning. A thicker prepreg material can also be used for a belt. The fiber surface weights of such material could advantageously be greater than approximately 1000 grams per square meter, potentially even greater than 2000 grams per square meter.

During the adhesion of the suction-side half shell with the pressure-side half shell into a rotor blade, the belt/bar groups of these sides can also be adhered together according to the invention, preferably into a box shape and preferably with thick-layer adhesions.

Through the production concept according to the invention, the production frequency can be considerably increased, since important parts can be prefabricated outside of the main mold, for example also in parallel, e.g. with the use of two teams. The step of hardening and gluing in place the bars, which alone can easily take up to more than 3 hours per rotor blade, is also preferably omitted. The efficiency of the production thereby increases significantly.

During the infusion of belts, there is a risk of the formation of waves, in particular during a too fast and uncontrolled hardening. According to the invention, this can be prevented through use of prepregs, which also simultaneously accelerates the production step here. The use of thick prepregs, potentially also in the segments, further reduces the processing time without seriously changing the cost of the material. The stability properties of the rotor blade are also not changed by this.

It has also been shown according to the invention that not yet hardened, but potentially thoroughly prehardened or tempered prepregs or correspondingly prefabricated components with not yet hardened infusion material can be well and securely connected to separation surfaces with plastics technology, since the resins easily bond to the separation surfaces. Compared to gluing, the process risk is thereby reduced. Costs can be reduced and adhesion errors, such as voids, adhesive layers that are too think, brittleness or the like cease to exist.

The invention claimed is:

1. A method of production of a rotor blade for a wind turbine, which extends longitudinally in an operational state from a blade root area for connection to a rotor hub of the wind turbine up to a blade tip, comprising the steps of:

providing at least two subdivisions approximately transverse to a longitudinal extension of the rotor blade between the blade root area and the blade tip for formation of at least three segments;

inserting at least two segments of the at least three segments into an integration device such that a gap that is located between the at least two subdivisions is provided for insertion of an inflow of a free-flowing connection material and a solid material; and interconnecting the at least two segments in the integration device, wherein in the integration device, the at least two segments and/or components are adhered together with plastics technology.

2. The method according to claim 1, wherein the rotor blade is mainly subdivided into a lower half shell and an upper half shell and segmentation is provided per half shell.

3. The method according to claim 1, wherein at least one subdivision of the at least two subdivisions runs approximately in the longitudinal extension of the rotor blade for segmenting the rotor blade.

4. The method according to claim 1, wherein in the integration device, one or more bars, one or more belts, one or more rotor blade root parts, segments and/or rotor blade shells formed from segments are interconnected.

5. The method according to claim 4, wherein the bars, belts, rotor blade roots and/or segments are produced with the plastics technology.

6. The method according to claim 5, wherein at least one resin and at least one fiber layer, made of glass fibers and/or carbon fibers, is used in the plastics technology.

7. The method according to claim 6, wherein resin transfer molding (RTM) technology is used.

8. The method according to claim 6, wherein vacuum-assisted resin infusion (VAR) technology is used.

9. The method according to claim 6, wherein a lamination technique is used.

10. The method according to claim 1, wherein the components are trimmed.

11. The method according to claim 10, wherein balsa wood or a balsa wood sandwich is used for the trimming.

12. The method according to claim 1, wherein at least one electrical heating device is used for heating, drying and/or hardening of the components.

13. The method according to claim 12, wherein the components are first hardened or pre-hardened, the components are then put into the integration device, interconnected there and a composite of the components is then dried and/or hardened.

14. The method according to claim 1, wherein parallel usable in time manufacturing molds are used to produce the components.

15. The method according to claim 1, wherein the integration device is used as a manufacturing mold for a half shell of the rotor blade, and wherein at least a first segment of the at least three segments is inserted prefabricated or semi-prefabricated into the integration device and at least a second segment of the at least three segments is first produced in the integration device on the first segment or under integration of the first segment.

16. The method according to claim 15, wherein in the integration device during the production of the half shell of the rotor blade, a finished or semi-finished first segment and the second segment to be produced alternate spatially during usage of the integration device.

17. The method according to claim 15, wherein at least one belt and at least one bar are prefabricated and integrated or connected in the integration device with the half shell of the rotor blade.

18. The method according to claim 17, wherein at least one belt or one bar bridges a separation between two segments of the half shell.

19. The method according to claim 17, wherein at least one belt/bar assembly group is prefabricated and given to the integration device for connection with a shell of the rotor blade.

20. The method according to claim 19, wherein the half shell is produced at least partially in the integration device and the belt/bar assembly is thereby integrated into the half shell.

21. The method according to claim 20, wherein at least one layer is used for the production of the half shell for connection of the half shell with the belt/bar assembly.

22. The method according to claim 20, wherein for the production of the half shell using vacuum infusion technology or another vacuum-assisted plastics technology, a vacuum seal with at least one film occurs and that the belt/bar assembly is incorporated in the seal for production of the half shell for connection with the half shell.

23. The method according to claim 19, wherein the belt/bar assembly is produced such that the belt and the bar are mainly aligned with each other in an L shape.

24. The method according to claim 23, wherein the L shape can thereby be connected with the shell of the rotor blade such that the bar rises out of the shell and that this L shape with a corresponding L shape of another shell mainly forms a box shape during connection of the two shells with each other.

25. The method according to claim 23, wherein for production of the L shape a manufacturing mold is used, in which the belt participating in the L shape and the participating bar are arranged and/or produced at the correct angle to each other.

26. The method according to claim 25, wherein at least the belt or the bar is incorporated prefabricated into the manufacturing mold and the other part, with layers for the plastics technology, is produced.

27. The method according to claim 25, wherein at least one of the components is produced from prefabricated parts so as to define prepregs.

28. The method according to claim 25, wherein the manufacturing mold has a mainly approximately V-shaped depression for the L-shaped incorporation of material.

29. The method according to claim 25, wherein the manufacturing mold is pivotable around a mainly horizontal axis.

30. The method according to claim 23, wherein at least one layer is incorporated into the manufacturing mold for the production of at least the belt or the bar such that it bridges a butt joint between the two parts such that a connection is established between the parts also through this layer during the production of the belt and/or the bar.

31. The method according to claim 30, wherein the bar is designed mainly approximately C-shaped for formation of connection flanges.

32. A method of production of a rotor blade for a wind turbine, which extends longitudinally in an operational state from a blade root area for connection to a rotor hub of the wind turbine up to a blade tip, comprising the steps of:

providing at least two subdivisions approximately transverse to a longitudinal extension of the rotor blade between the blade root area and the blade tip for formation of at least three segments;

inserting at least two segments of the at least three segments into an integration device such that a gap that is located between the at least two subdivisions is provided for insertion of an inflow of a free-flowing connection material and a solid material; and interconnecting the at least two segments in the integration device, wherein a production parallel in time of components is performed, in which the components to be produced, according to their type, quality and/or size, are such that the components can be made available to the integration device together within 24 hours.

33. The method according to claim 32, wherein the production of the components and their integration in the integration device is planned and performed such that the rotor blade is almost provided within 48 hours.

34. The method according to claim 32, wherein in the integration device, the at least two segments and/or the components are interconnected through frictional and/or form fit connections, through butt-strapping, joining, scarfing, groove and springs.

35. A method of production of a rotor blade for a wind turbine, which extends longitudinally in an operational state from a blade root area for connection to a rotor hub of the wind turbine up to a blade tip, comprising the steps of providing at least two subdivisions approximately transverse to a longitudinal extension of the rotor blade between the blade root area and the blade tip for the formation of at least three segments;

inserting at least two segments of the at least three segments into an integration device such that a gap that is located between the at least two subdivisions is provided for insertion of an inflow of a free-flowing connection material and a solid material; and interconnecting the at least two segments in the integration device, wherein in the integration device, the at least two segments and/or components are adhered together, wherein at least one electrical heating device is used for heating, drying and/or hardening of the components, and wherein the components are first hardened or pre-hardened, the components are then put into the integration device, interconnected there and a composite of the components is then dried and/or hardened.

36. The method according to claim 35, wherein in the integration device, the at least two segments and/or the components are interconnected through frictional and/or form fit connections, through butt-strapping, joining, scarfing, groove and springs.

\* \* \* \* \*